(12) United States Patent
Vastardis

(10) Patent No.: US 8,383,180 B2
(45) Date of Patent: Feb. 26, 2013

(54) VACUUM BREWED BEVERAGE METHOD

(76) Inventor: Dean J. Vastardis, Palmyra, NJ (US)

( * ) Notice: Subject to any disclaimer, the term of this patent is extended or adjusted under 35 U.S.C. 154(b) by 653 days.

(21) Appl. No.: 12/589,784

(22) Filed: Oct. 28, 2009

(65) Prior Publication Data

US 2011/0097466 A1    Apr. 28, 2011

(51) Int. Cl.
*A23F 5/26* (2006.01)
*A23F 3/36* (2006.01)

(52) U.S. Cl. .................. 426/433; 426/431; 426/435

(58) Field of Classification Search .............. 426/431, 426/433, 435
See application file for complete search history.

(56) References Cited

U.S. PATENT DOCUMENTS

| | | | |
|---|---|---|---|
| 1,674,857 A | | 6/1928 | Emerson |
| 1,751,477 A | * | 3/1930 | Greenwald ............. 426/433 |
| 1,947,426 A | * | 2/1934 | Smith .................... 99/281 |
| 1,952,733 A | * | 3/1934 | Smith .................... 426/432 |
| 1,980,735 A | * | 11/1934 | Smith .................... 99/281 |
| 2,079,603 A | | 5/1937 | Davis |
| 2,181,090 A | * | 11/1939 | Lucia .................... 99/281 |
| 2,203,638 A | | 6/1940 | Smaltz et al. |
| 2,212,100 A | * | 8/1940 | Keaton ................... 99/281 |
| 2,223,450 A | * | 12/1940 | Jepson et al. ............. 99/281 |
| 2,232,614 A | * | 2/1941 | Kopf ..................... 99/292 |
| 2,289,498 A | * | 7/1942 | Hons, Jr. ................ 210/477 |
| 2,312,555 A | * | 3/1943 | Jepson ................... 99/281 |
| 2,338,140 A | | 1/1944 | States |
| 2,403,404 A | * | 7/1946 | Scott .................... 99/302 R |
| 2,467,817 A | | 4/1949 | Dietz |
| 2,708,398 A | * | 5/1955 | Mertler .................. 99/281 |
| 2,885,294 A | | 5/1959 | Larson et al. |
| 3,181,951 A | | 5/1965 | Gronvold |
| 6,295,920 B1 | | 10/2001 | Barden et al. |
| 6,578,467 B1 | * | 6/2003 | Taylor et al. ............. 99/281 |
| 2008/0212403 A1 | | 9/2008 | Garman et al. |

* cited by examiner

*Primary Examiner* — Anthony Weier
(74) *Attorney, Agent, or Firm* — Riverside Law LLP

(57) ABSTRACT

The desired amount of coffee grounds, tea leaves, herbs or other beverage making material is placed in a chamber of glass vessel located on a moveable table top in its lowered position. The table top is then elevated until the upper edge of the vessel seals against a top seal. With the top sealed, the desired amount of water of about 185°-212° F. is introduced into the chamber through a port in the top. Thereafter, a vacuum is drawn in the chamber and is held within the range of about −5 to −20 Hg in. Using an external heat source, the brewing liquid is maintained at about 185°-212° F. Alternatively, the vacuum can be pulsed by turning it on and off several times during the brewing cycle. After the beverage has brewed for the desired amount of time, the heat and vacuum are removed, the chamber is returned to atmospheric pressure and the table top is lowered to release the vessel. The contents of the chamber are then strained to remove solids from the beverage.

10 Claims, 1 Drawing Sheet

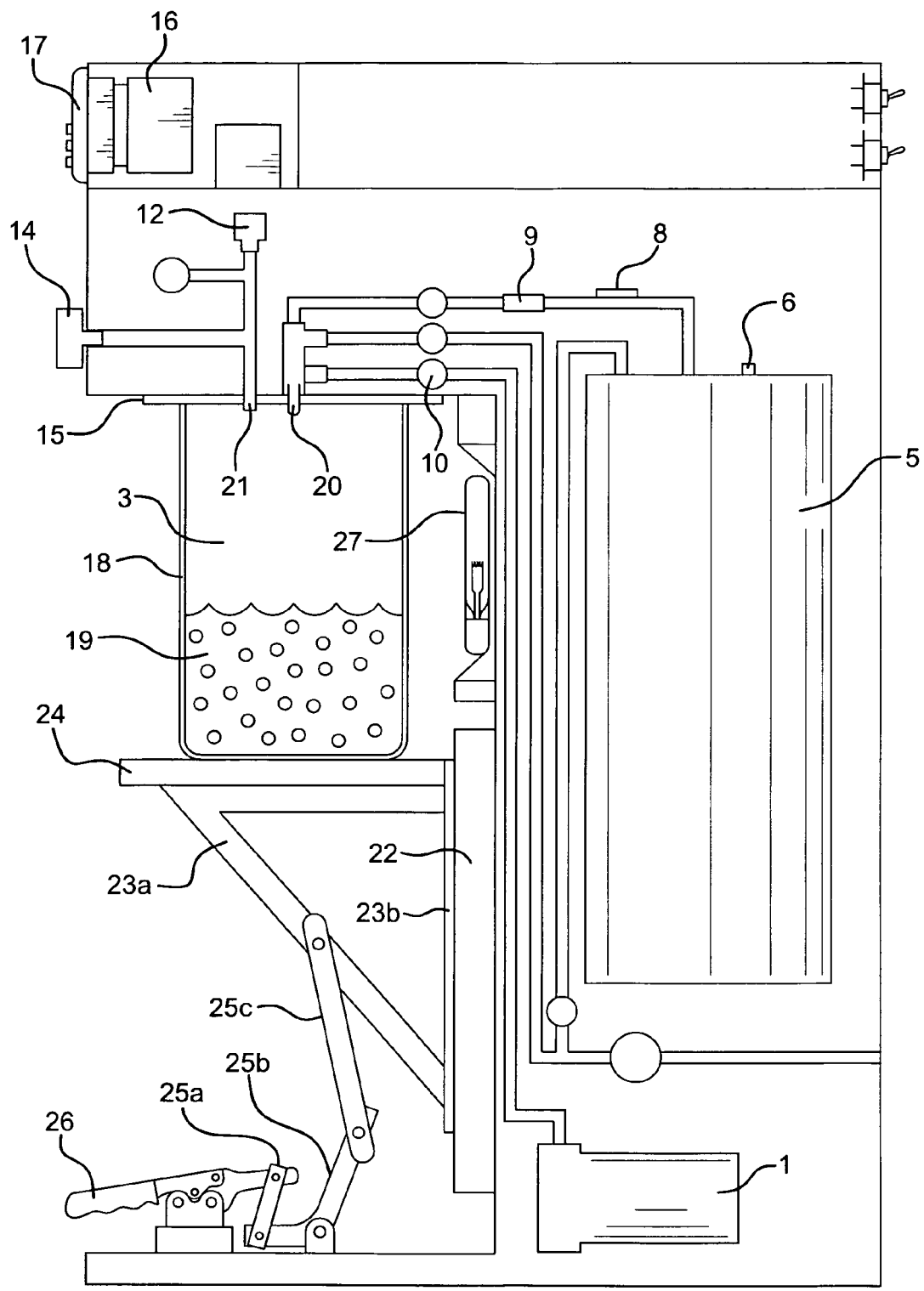

VACUUM BREWED BEVERAGE METHOD

BACKGROUND OF THE INVENTION

The present invention is directed toward a beverage brewing machine that brews a beverage in a vacuum and more particularly, toward a machine that evacuates a chamber for creating a vacuum in which chamber the beverage is brewed. The invention is also directed to the method of brewing in a vacuum.

Brewed beverages, such as coffee or tea, are very popular and common among many types of people in various cultures and in numerous countries around the world. Getting the best quality brew in the most efficient manner has been the goal of many coffee and tea brewers for many years.

Over the last two decades the coffee and tea industry has evolved from a commodity based industry to one of specialty products, retail outlets and consumer driven increase of quality and cost. Starbucks Corporation sparked the evolution within the industry in the United States resulting in retail concept and beverage concept innovation, the birth of the US style "Café Culture" and consumer demand for better quality coffee products. However, this entire evolution of the coffee industry was built on the methods and technologies developed over 80 years ago.

The French press was invented in the 1850's. The espresso machine was created in 1822. Emerson's vacuum brewer was invented in 1922. Melitta Bentz's coffee filters were invented in 1908. There have been numerous modifications, improvements and automations to these processes and apparatuses over the years. However, despite the explosion of beverage and retail innovation over the last two decades not one significant new brewing/infusing process has emerged.

In 2006 The Coffee Equipment Company launched "the Clover", which is an automated French press, capable of making a hot beverage in less than 60 seconds. The apparatus proved that there is a need for single serving, quick turn over and created a niche in the industry where ultra premium coffees could now be brewed and served by the cup in an acceptable retail turnover rate. The Coffee Equipment Company was soon recognized for their "Clover" by Starbucks and was purchased in 2008. The purchase created a void in the market for a single serving brewer capable of creating ultra premium drinks in under 60 seconds.

The "cold brewing" of coffee and tea has also been practiced for countless years in countries around the world. This process involves the soaking and or brewing/infusing of coffee or tea with room temperature water in a vessel for 12 to 24 hours. This process is considered by many as the optimal method to extracting the right solid from the dried media. However, the process takes too much time for the typical consumer.

The niche created by the "Clover" and the "cold brewing" method became the inspiration for the development of the inventive process and apparatus described herein. The goal was to create a process that could be versatile enough to be used to brew both coffee and tea, as well as to brew using both with hot and cold water. The invention is a completely new and unique process which does not adhere to any of the restrictions or methods of anything that has ever existed. The process, which brews in a vacuum environment, has tremendous range in all the parameters and can be utilized to brew as quickly or slowly, as hot or as cold as desired in less time then conventional methods allow.

The term "vacuum" has been used in the past in connection with the brewing of coffee. For example, in 1922 Emerson was issued U.S. Pat. No. 1,674,857 for a "vacuum" brewing process. This conventional process involves an upper and lower vessel. The lower vessel holds water and is placed above a heat source. The upper vessel holds the dried media or coffee. The upper vessel, resembling a funnel with a long neck, sits atop the lower vessel. The long stem from the upper vessel goes down into the lower vessel below the water level. The two are connected via an airtight seal at the top of the lower vessel and the beginning of the neck for the upper.

When the water is heated it rises through the tube into the upper vessel and saturates the dried media in the funnel of the upper vessel. Once the heat is removed a "vacuum" occurs in the lower vessel as the water vapor contracts as it cools. The resulting vacuum creates a suction which pulls the liquid from the upper vessel back down to the lower vessel. Therefore, the "vacuum" acts as a mechanism to create extract or to suck the liquid through the coffee and filter in order to separate the two. There is no point where the coffee or dried media brew inside a vacuum during the process defined by Emerson. Similar systems are shown in U.S. Pat. No. 6,295,920 to Barden et al. and U.S. Pat. No. 2,467,817 to Dietz.

Automated "vacuum" brewers such as Starbucks's "Clover" operate under the same principal of brewing under normal atmospheric conditions while using suction/vacuum pressure below a filter as a mechanism to separate liquid from solids. There is no suggestion of brewing the water and dried media completely inside a vacuum chamber while negative pressure is occurring.

In 1935 Davis was granted U.S. Pat. No. 2,079,603 that describes a coffee maker wherein a "vacuum" is partially created to aid as a mechanism to create movement within the brewing apparatus. During the brewing process the heating of the water creates steam pressure which actually suspends the upper vessel like a hot air balloon above a steaming pot of water. When the heat is removed the steam pressure cools thus creating a vacuum, allowing the upper vessel, with dried media (coffee) to descend into the hot water. When the vacuum has pulled all available water inside the vessel, outside air is pulled in through the open spouts through the coffee creating a bubbling action.

The liquid in the Davis system is not boiling or bubbling due to a lack of surface pressure, but is bubbling due to the air which is getting pulled in through available vents into the process chamber. Since the entire apparatus is not sealed there is no possibility for the brewing to occur in a stabilized vacuum. Nor is there any mention of the brewing process occurring in a vacuum.

Although coffee, tea and other beverages have not previously been brewed in a vacuum, it has been suggested to use a vacuum to cook other food products. For example, in 1940 Smaltz was granted U.S. Pat. No. 2,203,638 for a "Vacuum Cooking and Cooling" process for the processing of pie fillings, fruit preserves or the similar food products. According to the patent, a vacuum is pulled until all evaporation is complete. This is achieved by continuously running the vacuum pump and expelling the vacated vapor and air while the vacuum component of the process is being applied. There are no one way valves or manual valves that would allow for the vacuum to be regulated at anything other than the maximum capacity of the pump which is −29 Hg in.

As the Smaltz's patent states, 29 inches of mercury vacuum will cause the pie filling to rapidly cool thereby halting the cooking process while allowing the product to cool rapidly without separating. He mentions that the vacuum/cooling process is a part of the process to reach a final finished product, whereas the removal of water vapors and temperature is defined as part of the "cooking" and "cooling" process. Cooking is defined as preparing under the application of heat.

Therefore, Smaltz is only cooling with a vacuum, not cooking and there is no suggestion therein that his process can be used to brew coffee or tea or other beverage.

U.S. Pat. No. 2,885,294 issued to Larson in 1959 for an invention entitled "Oven and Method of Preparing Food". The patent describes the beginning of the cooking process where a super atmospheric cycle or a "downward displacement" method are utilized to remove ambient air, which is replaced by steam pressure to cook the foodstuff quickly, without contaminants and without "impregnating" or saturating the interior of the foodstuff with water molecules. The ambient air is removed to prevent the loss of vitamins or nutritional elements as well as to avoid the "impregnation" and or saturation of the foodstuff with water molecules during the cooking process.

Larson mentions using a vacuum pump in the beginning of the cooking process for the sole reason of removing ambient air. This void is then filled with the expanding gasses of steam which is heated further by the heated walls of the oven, thus resulting in a positive pressure atmosphere. The cooking, therefore, does not actually take place in a vacuum. Furthermore, there is no suggestion in Larson that his process can be used to brew coffee or tea.

A need clearly exists for a beverage brewing machine and process that can provide a quick and efficient method for brewing a high quality beverage. It has been found that this can be accomplished by the proper use of a vacuum. To Applicant's knowledge, no one has attempted to brew coffee or tea or other beverage utilizing a vacuum in the chamber in which the beverage is brewed.

SUMMARY OF THE INVENTION

The present invention is designed to overcome the deficiencies of the prior art discussed above. It is an object of the present invention to provide a beverage brewing machine and process that can be used to brew a beverage, such as coffee or tea, or other dried media in cold or hot water.

It is another object of the present invention to provide a beverage brewing machine and process that allows the beverage to be brewed in a vacuum chamber.

It is a further object of the present invention to provide a beverage brewing machine and process that allows a beverage to be brewed quickly and easily.

In accordance with the illustrative embodiments demonstrating features and advantages of the present invention, the desired amount of ground coffee, tea, herbs or other material is placed in a chamber of glass vessel. The vessel is then placed on a moveable table top while it is in its lowered position. The table top is then elevated until the upper edge of the vessel seals against a top seal. Once the top is sealed, the desired amount of hot water, in a temperature range of about 185°-212° F., is introduced into the chamber through a port in the top. Thereafter, a vacuum is drawn in the chamber by activating a valve or turning on a vacuum pump which also communicates with the chamber through an additional port. The vacuum within the chamber is held within the range of about −5 to −20 Hg inches and using an external heat source, the liquid within the chamber is maintained at about 185°-212° F. Alternatively, the vacuum can be pulsed. That is, it can be turned on and off several times during the brewing cycle. After the beverage has brewed for the desired amount of time, the heat and vacuum are turned off, the chamber is returned to atmospheric pressure and the table top is lowered to release the vessel. The contents of the chamber are then strained to remove solids from the beverage.

Other objects, features, and advantages of the invention will be readily apparent from the following detailed description of a preferred embodiment thereof taken in conjunction with the drawings.

BRIEF DESCRIPTION OF THE DRAWING

For the purpose of illustrating the invention, there is shown in the accompanying drawing one form that is presently preferred; it being understood that the invention is not intended to be limited to the precise arrangements and instrumentalities shown.

FIG. 1 is a schematic representation of a beverage brewing machine illustrating the features of the invention.

DETAILED DESCRIPTION OF THE PREFERRED EMBODIMENT

Referring now to the drawing there is shown in FIG. 1 a schematic representation of a beverage brewing machine constructed in accordance with the principles of the present invention. The entire process for the brewing/infusing dried media such as coffee, tea or herbs, in accordance with the invention, takes place inside a sealed vacuum chamber 3. This chamber 3 may comprise but is not limited to, a vessel as the main body of the vacuum chamber, wherein the hot or cold water and dried media 19 will remain throughout the process. A seal may be created by a top or lid 15 with a gasket of silicone or a similar material to create the airtight seal between the vessel 3 and the lid 15. The lid 15 may have one or more ports, such as shown at 20 and 21, which may be utilized for evacuation of atmosphere, pressure transducers/sensors/switches, gauges and or for directing water into the chamber.

Means are also provided for applying pressure between the lid 15 and the vessel or chamber 3 to insure that the gasket creates a proper seal. This is accomplished through the use of a lift table having a table surface 24 on which the vessel 3 is placed. The table surface 24 is supported by a frame comprised of an angle bracket 23a and a vertical bracket 23b. The vertical bracket 23b slides in a fixed linear slide support 22 and can be moved up and down through the movement of adjustable arms 25a, 25b and 25c. A hold down clamp 26 holds the table surface 24 with the vessel 3 placed thereon in the upper sealed position as seen the FIG. 1. The foregoing is, of course, by way of example only. The lift or pressure to achieve a proper seal may be created with the use of many other available lifting mechanisms such as hydraulic or pneumatic pistons, gas springs, screws, pulleys, latches, clamps or twist lock systems known in the art. As should also be readily apparent to those skilled in the art, in lieu of holding the lid 15 still and moving the vessel 3, one could hold the vessel fixed and move the lid downwardly to create a seal or both could move toward the other.

The vessel or brew chamber 3 could be in the form of a glass vessel 18. High temperature tempered glass with properties such as that sold under the PYREX trademark would be most suitable for the invention due to the temperature resistance, transparency and the chemical resistance. The transparency of the glass allows for one to visually inspect the process during the brewing/infusing cycle, while also allowing for a visual/theatrical element which allows not just the operator but the audience/customer an opportunity to see the process to completion. The chemical resistance of the glass is required to ensure that the vessel can be washed after each use without retaining any oils or flavors from the previous brew cycle, so as not to contaminate the beverage. This lack of residual flavors from pervious cycles gives the process the ability to brew both coffee and tea without contaminating the taste of the beverages.

The process and apparatus may use an energy source 27 which may create light or heat or both, during the brewing/infusing cycle. Adding light above, below or behind the vessel while brewing creates an illumination of the contents of the vessel. The light allows the operator to inspect and the audience to observe the movement of the liquid and dried media during the brewing/infusing process. This light may also provide necessary heat to help maintain liquid temperature during the brewing/infusing cycle. The heat may be transmitted to the glass 18 and the liquid 19 in order to offset the temperature loss of the liquid when the initial vacuum is evacuated. This heat may be required in order to maintain the proper temperature range of the liquid during the process.

The process works best when the heated water is in the range of about 185°-212° F. for hot brewing/infusing. This temperature is required to properly brew and/or infuse the dried media. Temperatures above this range may "burn" or "scorch" the desired solids inside the dried media as well as "over extract" the solids from the dried media, thus possibly resulting in an undesirable flavor or beverage. If temperatures below the desired range are utilized during the hot brew/infuse cycle the process will not fully achieve the extraction of the desired solids thus resulting in an underdeveloped flavor or beverage. However, the "cold brewing/infusing" process achieves the proper extraction of solids due to the prolonged brew/infuse time of 0.5-5 hrs while under a controlled vacuum pressure.

The hot water process requires that the temperature range be maintained within the necessary range throughout the brewing/infusion process in order to properly extract the desired solids. Temperature loss of the hot liquid can occur when a vacuum is created within the chamber 3, when the water begins to boil below temperature and the water vapors are removed. At standard atmospheric pressure, water boils at 212° F. However, a "boiling" effect occurs when the vacuum decreases air pressure above the liquid thus allowing the water to become unstable and "boil" although under 212° F.

The cooler the temperature of the water, the deeper the vacuum needs to be in order to achieve the "boiling" action. Rather than continuously pull a deep vacuum to maintain the "boiling" action of the liquid throughout the process in order to cool and rapidly remove the water vapors from their "foodstuff" as done in the Smaltz's and Larson's processes described above, the present hot water process is designed to regulate the predetermined negative pressure, within the optimal range of vacuum pressures at about −5 to −20 Hg in (inches of mercury) throughout the brewing/infusing process. This regulation is necessary in order to allow for the hot water to boil below temperature at the start of the brewing/infusing process in order to start a release of gasses from within the dried media. The "boiling" action occurs once the vacuum enters the desired range and the vacuum becomes regulated. This "boiling" action would slow or stop because of temperature loss. These gasses are created as a result the pores of the dried media opening up while under the regulated vacuum, allowing water molecules to displace the gases inside the pores of the dried media and rise to the surface. This occurrence continues the agitation and movement of the liquid and dried media, throughout the remainder of the brewing/infusing cycle, which is essential to the brewing/infusing process.

The release of gasses as just explained eliminates the need to use a deepening vacuum pressure to maintain the movement of the water throughout the brew/infuse cycle, therefore minimizing temperature and water vapor loss, thus allowing the liquid and dried media to stay within the necessary temperature range. As pointed out above, a source of energy 27 may also be used, and may provide heat to offset or minimize temperature losses during the brewing/infusing process and to provide light to add a visual aid and or theatrical element to the process, or both.

The temperature of the liquid for the hot water process may be achieved and maintained by numerous available methods. Methods for heating the water to the desired temperature may include but is not limited to available mechanisms such as hot water holding tanks, as seen in conventional commercial brewing equipment or hot water on demand heat exchange systems, similar to those utilized commercially and in homes which replace traditional hot water heaters. A modified version of the "hot water on demand" system 5 may be used with a variable volume regulating valve 9 (similar to omega.com #FLV400) in order to decrease or increase the contact time of the liquid while passing throughout the heat exchanger/block. Such control of contact time would allow the operator to change the exact temperature of each specific brew cycle for the specific ideal temperatures that the tea or coffee might need to create the best final product. A thermistor 8 may be used to read the temperature of the liquid exiting the heat exchanger, therefore sending the information to the "PLC" 16 or digital control system, which may increase of decrease the flow of the liquid through the heat exchanger in order to regulate to the desired temperature. Whereas, the more traditional hot water holding/heating tanks 5 may achieve the regulation of temperature using available means such as, but not limited to, gas mechanical thermostats or thermocouples 6 in communication with the control unit 16.

The inventive process also requires that there be a means of evacuating the atmosphere from the brew/infusion chamber 3. The process requires that the evacuation of atmosphere is achieved quickly, therefore such available mechanisms as vacuum pumps 1 and a venturi vacuum may be utilized to achieve evacuation in the required time. The preferred apparatus is a vacuum pump 1, purchased from KNF. This pump may be located internally or externally of a housing for the machine depending on mechanical configurations.

The vacuum system may be controlled by a central control unit, such as a PLC 16, or may be controlled with more conventional methods such as timers and relays. The negative pressure may be, but is not limited to, regulated with the use of a mechanical vacuum switch 12 which activates a means of stopping the evacuation, by deactivating the pump or closing a valve, when the desired set point of negative pressure is attained. In the event that there is a leak and pressure inside the chamber rises above the set limit. The vacuum pump may operate in conjunction with electrically controlled valves 10 to avoid starting and stopping the pump if needed to maintain proper pressure during the cycle. A vacuum gauge 14, visible to the operator, can be used to show the pressure within the vessel 3.

The basic mechanical functions of all process parameters can be controlled individually through low tech available mechanisms such as timers, thermostats, relays and mechanical switches and buttons. However, the system may be automated by controlling process parameters through the use of a central control unit such as a PLC 16 (programmable logic controller) with external visual displays 17 and buttons. The central control unit can allow for greater accuracy with each process parameter. In addition to the basic control of process parameters, the central control unit can add the capability to allow for the creation of specific brewing parameters or "recipes" for individual coffees, teas, or herbs. This may allow the user to program a specific name of the product to be brewed and the exact parameters such as, but not limited to, water temperature, vacuum pressure, brew time, hold times, and liquid volumes.

The Central control unit may also allow the apparatus to be linked into a network via, Ethernet or Wi Fi. This connectivity may allow access via the local network or remote access to data such as a variety of accounting information, error codes, service alerts, as well as the ability to change or alter standard system process parameters and add or edit "Recipes".

As should be readily apparent from the forgoing, the apparatus described above is used in the following manner. The desired amount of ground coffee, tea, herbs or other material is placed in the chamber 3 of the glass vessel 18. The vessel is then placed on the moveable table top 24 while it is in its lowered position. The table top is then elevated until the upper edge of the vessel 18 seals against the top 15. Once the top is sealed, the desired amount of hot water, in a temperature range of about 185°-212° F., is introduced into the chamber 3 through the port 20. (In lieu of introducing hot water into the chamber, it is also possible to provide an arrangement wherein cold or tap water is used and the combined water and brewing material are then heated to the desired temperature.) Thereafter, a vacuum is drawn in the chamber 3 by activating valve 10 and/or turning on vacuum pump 1 which also communicates with the chamber 3 through port 20.

The vacuum within the chamber 3 is preferably held within the optimal range of about −5 to −20 Hg in. Using the energy source 27 or some other external heat source, the liquid within the chamber 3 is maintained at the desired temperature of about 185°-212° F. Alternatively, it has been found that good results are achieved if the vacuum is pulsed. That is, after the dried media is mixed with water, it is put under a vacuum for about 5 seconds and then brought back to atmospheric pressure for approximately 30 to 60 seconds. The vacuum is then reapplied for another 5 seconds. This is, of course, by way of example only as the process is not limited to these on/off times or to the number of pulses that may be applied during each brewing cycle. As should be readily apparent, the Central control unit can be used to control the brewing cycle and the number and duration of pulses as desired.

After the coffee, tea or other beverage has brewed for the desired amount of time, the heat and vacuum are turned off and the chamber is returned to atmospheric pressure. The table top 24 is then lowered to release the vessel 18. The contents of the chamber can then be strained by any traditional means such as by using French press screens or paper filters.

The separation of liquid and media may also occur as an automated step in the process. This process would occur once the brewing is complete and the vacuum is released. The pump 1 could then activate and, through proper valving, pressurize the brew chamber, forcing the liquid through a screen below the coffee grounds or other media and out a one way valve in the bottom of the chamber. Such a step would, of course, require a modified brew chamber that includes a one way valve in the center of the base and a screen to cover the inside bottom of the vessel in order to separate the solid media from the liquid during the dispensing process.

The present invention may be embodied in other specific forms without departing from the spirit or essential attributes thereof and accordingly, reference should be made to the appended claims rather than to the foregoing specification as indicating the scope of the invention.

I claim:

1. A beverage brewing process comprising the steps of:
    placing a desired amount of a solid beverage brewing material into a chamber at atmospheric pressure;
    placing a desired amount of water into said chamber;
    sealing said chamber from the surrounding atmosphere;
    creating a vacuum within said chamber by drawing a vacuum utilizing a vacuum source located outside of said chamber;
    allowing said brewing material and water to brew in said chamber under the influence of said vacuum for a desired period of time;
    removing said vacuum from said chamber thereby allowing the pressure in said chamber to return to atmospheric pressure,
    repeating the steps of creating a vacuum within said chamber, allowing said brewing material and water to brew in said chamber under the influence of said vacuum and again removing said vacuum from said chamber, and
    separating said brewed liquid from said solid to created said beverage.

2. The beverage brewing process as claimed in claim 1 wherein the vacuum within said chamber is maintained in the range of about −5 to about −20 inches of mercury during each said brewing step.

3. The beverage brewing process as claimed in claim 1 wherein the temperature of said water is in the range of about 185° to about 212° F. when it is placed into said chamber.

4. The beverage brewing process as claimed in claim 1 wherein the temperature of said water is maintained in the range of about 185° to about 212° F. during said brewing step.

5. The beverage brewing process as claimed in claim 1 wherein separating said brewed liquid from said solid to created said beverage is accomplished by the use of a filter.

6. The beverage brewing process as claimed in claim 1 wherein said chamber has an open top and wherein said step of sealing said chamber includes placing a cover on said open top.

7. The beverage brewing process as claimed in claim 6 wherein said cover is placed on said open top by moving said chamber upwardly to seal against said cover.

8. The beverage brewing process as claimed in claim 1 wherein said chamber is comprised of a glass vessel.

9. The beverage brewing process as claimed in claim 1 wherein said beverage brewing material is comprised of ground coffee.

10. The beverage brewing process as claimed in claim 1 wherein said beverage brewing material is comprised of tea leaves.

* * * * *